June 27, 1950 E. G. LAPHAM 2,512,657
RADIO DIRECTION FINDER
Filed March 24, 1947 3 Sheets-Sheet 1
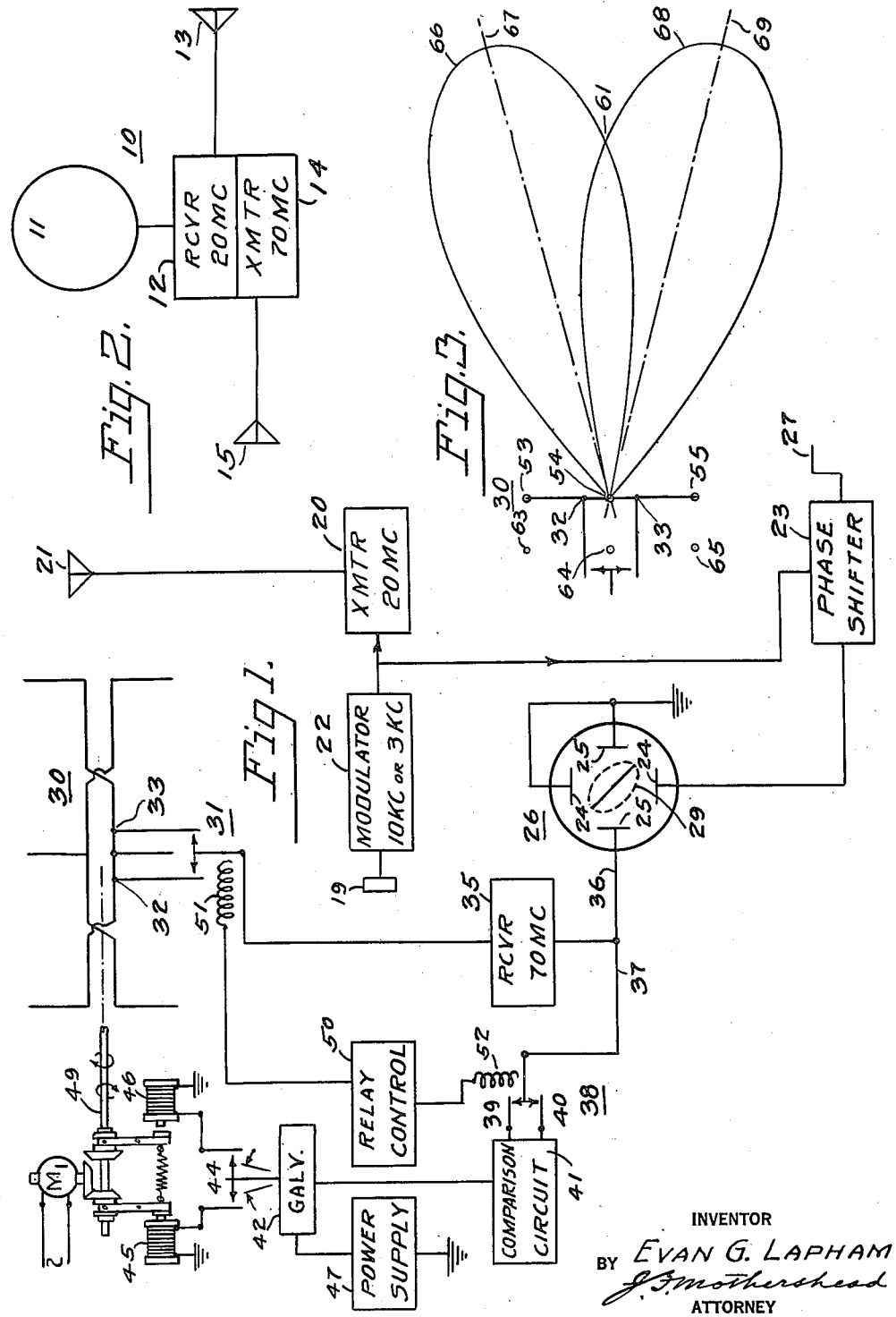
INVENTOR
Evan G. Lapham
BY
J. F. Mothershead
ATTORNEY

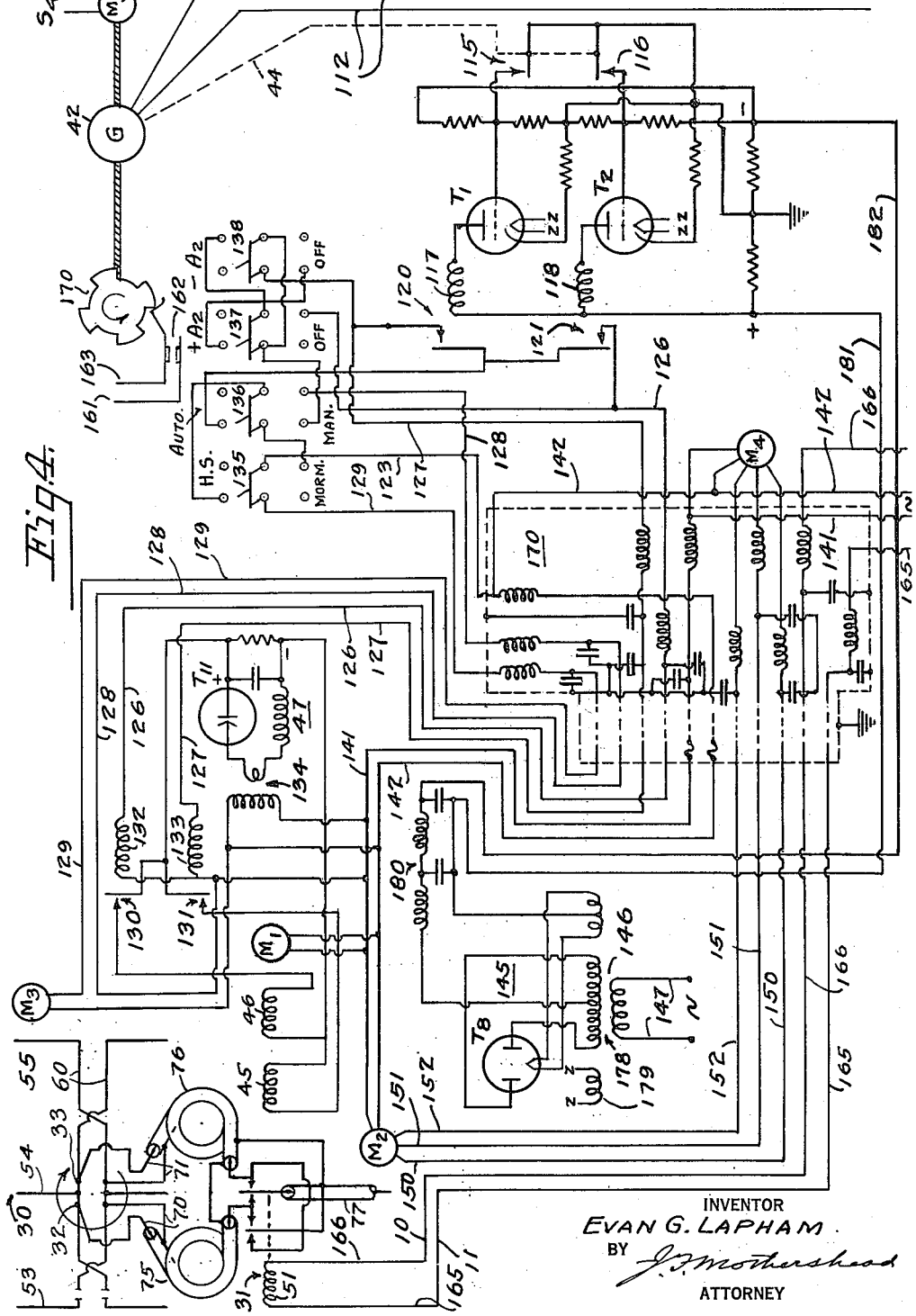

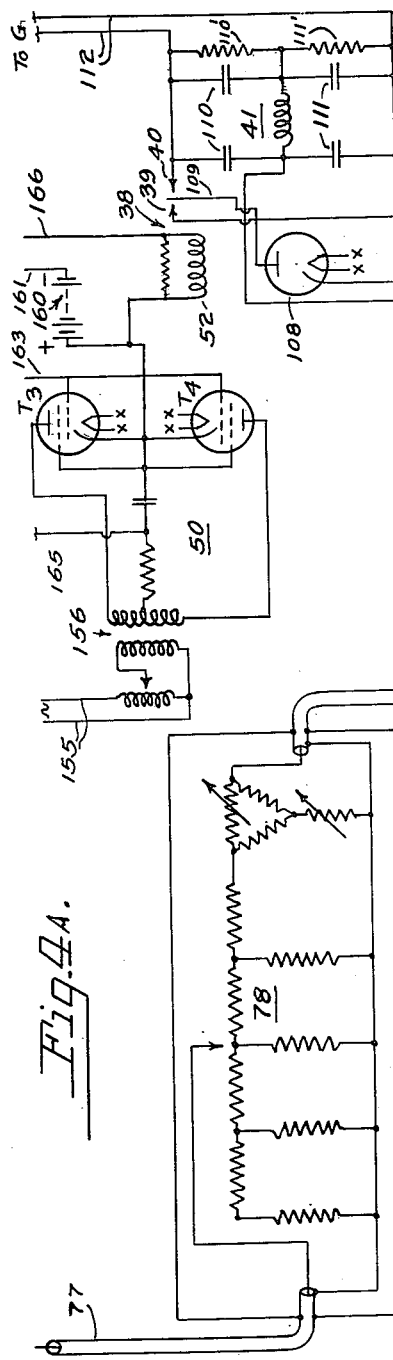

Patented June 27, 1950

2,512,657

UNITED STATES PATENT OFFICE 2,512,657

RADIO DIRECTION FINDER

Evan G. Lapham, Washington, D. C., assignor to the United States of America as represented by the Secretary of Commerce Application March 24, 1947, Serial No. 736,867

2 Claims. (Cl. 343—117)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to a radio direction finder and more particularly to an apparatus comprising radio receiving equipment used in conjunction with balloon borne radiosonde apparatus to determine upper air wind velocity and direction.

It is frequently desirable to measure wind velocity at various heights above the earth for use in estimating speeds and safety with regard to aircraft travel and for use in forecasting weather.

One method of determining wind velocity and direction is to release from the ground a small free balloon, follow its flight optically with one or more theodolites and thus determine the lateral movement of the balloon which is the same as the movement of the air in which the balloon is travelling. This method is not satisfactory where fog or clouds interfere with the use of optical instruments. Moreover, the use of optical instruments even on clear days is limited by the lateral distance the balloon is blown and by the altitude to which it ascends.

It is an object of this invention to provide a device for measuring wind velocity and direction without the use of optical instruments.

It is a further object to provide a device for giving, at frequent intervals, the azimuth and distance to a moving radio transmitter.

It is a further object to track a moving object from which a radio signal is received by means of shifting the maximum point of reception of an antenna to either side of the normal axis.

Other objects will become apparent from the following specification taken in connection with the drawing in which:

Fig. 1 is a block diagram of a ground installation embodying the principles of this invention.

Fig. 2 is a block diagram of the balloon unit used with the system of this invention.

Fig. 3 is a schematic diagram of the antenna used by this invention with curves showing the shifting of the axis of maximum reception.

Figs. 4 and 4a show a schematic diagram of the receiving system and antenna control system used in this invention.

Referring now more particularly to Figs. 1 and 2 for a general understanding of this invention, a free balloon unit 10 comprises a lifting gas bag 11, a receiver 12 having an antenna 13, and a transmitter 14 having an antenna 15. Receiver 12 is tuned to receive a modulated 20-megacycle carrier. Receiver 12 demodulates this carrier and supplies the modulation thereon to modulate the carrier frequency produced by transmitter 14. Transmitter 14 transmits a carrier of 70 megacycles.

A relatively fixed ground equipment includes a transmitter 20 having an antenna 21. Transmitter 20 produces a 20-megacycle carrier to which receiver 12 is tuned, said carrier being modulated by modulator 22. Modulator 22 produces a modulating frequency of either 3 kilocycles or 10 kilocycles. Control knob 19 is provided so that either 3-kilocycle or 10-kilocycle modulation frequency may be selected. In normal operation 10-kilocycle modulation is used. The modulation frequency produced by modulator 22 is also supplied to a phase shifter 23. Phase shifter 23 is provided with a crank 27, the rotation of which shifts the phase of the modulation frequency supplied by modulator 22 continuously from zero to any desired value. The output of phase shifter 23 is applied to one pair of deflection plates 24—24 of oscilloscope 26.

Also associated with said relatively fixed equipment is directional antenna 30. Antenna 30 has a normal balanced connecting point. However, antenna 30 is connected to a receiver 35 through a radio frequency transmission line to either of two offset connecting points 32 and 33. Receiver 35 is alternately connected by relay 31 to each of the connecting points 32 and 33, which are on opposite sides of the normal balanced connecting point. The output of receiver 35 is connected through conductor 36 to the other pair of deflecting plates 25—25 of oscilloscope 26. Receiver 35 is tuned to receive the 70-megacycle carrier produced by the balloon borne transmitter 14.

The output of receiver 35 is also supplied through conductor 37 and relay 38 to either of two input circuits 39 and 40 of comparison circuit 41 which compares the inputs and supplies a measure of the comparison to galvanometer 42. The pointer 44 of galvanometer 42 energizes either of magnetic clutch coils 45 and 46 from power supply 47. Motor M₁, which rotates continuously in one direction, is associated with shaft 49 and the magnetic clutches associated with magnets 45 and 46 so that shaft 49 turns clockwise, or counterclockwise, depending on whether clutch 45 or 46 is energized. The clutches associated with magnets 45 and 46 are in splined relation with the shaft 49. Shaft 49, which is stationary when neither clutch 45 nor 46 is energized, is associated with antenna 30 so that rotation of shaft 49 rotates antenna 30 about a substantially vertical axis.

Relays 31 and 38 operate synchronously through the action of relay coils 51 and 52, each of which is energized by relay control circuit 50. When receiver 35 is connected to antenna 30 at point 32 the output of receiver 35 is connected to input 39 of comparison circuit 41. When receiver 35 is connected to point 33 of antenna 30, the output of receiver 35 is connected to input 40 of comparison circuit 41. Relay control circuit 50 causes coils 51 and 52 of relays 31 and 38, respectively, to be energized and de-energized for equal short periods, said periods being of the order of two seconds in duration.

Referring now more particularly to Figs. 3 and 4, antenna 30 comprises coplanar, half-wave, vertical dipoles 53, 54, 55 spaced one-half wave apart and connected by transmission lines 60, suitably transposed to provide for in-phase connection of the three dipoles. The normal balanced connecting point of antenna 30 is at center dipole 54. However, the receiver is connected to antenna 30 through either of two offset connecting points 32 and 33. Three half-wave parasitic reflecting dipoles 63, 64 and 65 are placed one-quarter wave length behind radiating dipoles 53, 54 and 55, respectively. With a receiver connected to antenna 30 at the point 33 the major lobe of the reception pattern is substantially as shown by curve 66 which has an axis of maximum reception 67. With the receiver connected to point 32 the major lobe of the reception pattern is substantially as shown in curve 68 with an axis of maximum reception 69. It will be understood that the showing of antenna 30 in Fig. 1 is mostly symbolic and that all of the feeder connection and the reflecting dipoles are not shown in Fig. 1.

In the operation of the system shown in Figs. 1 and 2, transmitter 20 transmits a 20-megacycle carrier from a non-directive antenna 21. This 20-megacycle carrier, normally modulated by modulator 22 with a 10-kilocycle frequency, is received through antenna 13 by the receiver 12 of balloon unit 10. Receiver 12 demodulates the 20-megacycle carrier to obtain the 10-kilocycle frequency modulated thereon. Through connections between receiver 12 and transmitter 14 of balloon unit 10 the 70-megacycle carrier produced by transmitter 14 is modulated by the 10-kilocycle frequency without appreciable change in phase, or with a constant change in phase, and transmitted from non-directional antenna 15.

If antenna 30 is oriented so that its normal axis, the axis perpendicular to the plane of dipoles 53, 54 and 55 and passing through center dipole 54, points approximately at balloon unit 10, antenna 30 will pick up the modulated 70-megacycle carrier transmitted by transmitter 14. The energy collected by antenna 30 will be supplied from either point 32 or 33 and relay 31 to receiver 35. Receiver 35 will demodulate the 70-megacycle carrier to produce the modulation thereon, normally a 10-kilocyle frequency. This 10-kilocycle frequency will be supplied through conductor 36 to one set of deflection plates 25—25 of oscilloscope 26. Since the other set of deflecting plates 24—24 is supplied also with the 10-kilocycle frequency as shifted in phase by phase shifter 23, a Lissajous figure 29 will appear on the screen of oscilloscope 26.

Since the 10-kilocycle modulation frequency has traveled from the fixed ground equipment to the balloon and back, the 10-kilocycle frequency as received at the ground equipment will lag the 10-kilocycle frequency as produced at the ground equipment by an amount depending on the distance from the fixed equipment to the balloon. The distance to the balloon from the fixed equipment will be equal to one-half the wave-length of the modulation frequency multiplied by the number of cycles lag between the modulation frequency as produced and received by the ground equipment. By initial manipulation of the phase shifter crank 27 the Lissajous figure 29 may be caused to become a line. By further manipulation of crank 27, the Lissajous figure can be caused to remain a line instead of cyclically passing from a line to an oval and circle and back to a line as the distance between the fixed equipment and the balloon changes, the amount of rotation of crank 27 after the initial positioning of the Lissajous figure being a direct indication of the distance to the balloon 11.

Part of the 10-kilocycle frequency as demodulated by receiver 35 is supplied through relay 38 to either input 39 or 40 of comparison circuit 41. Input 39 receives a measure of the energy picked up at connecting point 32 of antenna 30 when the axis of maximum reception of antenna 30 coincides with axis 69 of Fig. 2. Input 40 of comparison circuit 41 receives a measure of the energy picked up by antenna 30 as supplied through connecting point 33 when the maximum axis of reception is along axis 67. It is therefore apparent that equal energy will be supplied to inputs 39 and 40 only when balloon unit 10 is in a vertical plane passing through the crossover point 61 of the antenna pattern and the dipole 54, or when balloon unit 10 lies approximately on the normal axis of maximum reception of antenna 30. Comparison circuit 41 supplies an output to galvanometer 42 which has one polarity if the input to 39 is greater than that supplies to 40, and an opposite polarity if the input to 40 is greater than that supplied to 39. There is no output supplied to galvanometer 42 when the inputs to 39 and 40 are equal.

When no input is supplied to galvanometer 42 its pointer 44 does not energize either magnetic clutch 45 or 46 but an input of one polarity will energize magnetic clutch 45 through power supply 47 while an input of the opposite polarity will energize magnetic clutch 46 from power supply 47. Hence, if equal energies are picked up by antenna 30 when the axis of the major lobe is shifted to axes 67 and 69, the normal axis indicates the azimuth of balloon unit 10 and the orientation of the antenna will not be disturbed. However, if greater energy is picked up when the major lobe is shifted along one axis than along the other, through the action of galvanometer 42, one of the magnetic clutches 45 or 46 will be energized causing motor M₁ and shaft 49 to rotate antenna 30 so that the axis 67 or 69, along whichever one the lesser energy was received, will be rotated to increase the energy received when the major lobe is along that axis until the energies received along the two axes are equal. Relay control 50 causes the energy picked up along the two axes 67 and 69 to be applied for short equal intervals to the inputs 39 and 40 of comparison circuit 41. This action produces rapid shift of major lobe from one axis to the other so that substantially simultaneous comparison of the received signal is made.

When modulator 22 is producing a 10-kilocycle modulation frequency and a 360° phase shift with crank 27 indicates about a 9-mile distance to the balloon, it is possible that the operator will not always know in which 9-mile range he is working at a particular time since the Lissajous figures would be the same for either 9, 18, 27, etc. miles. The operator may then by the use of control knob 19 cause modulator 22 to produce a 3-kilocycle modulation frequency which causes a 360° phase shift with crank 27 to cover a range of approximately 27 miles. The approximate distance to the balloon will then usually be determinable since it would be unlikely that the signal would be lost for a time sufficient for the balloon to travel more than 27 miles.

Referring now more particularly to Figs. 4 and 4a, for a detailed description of the receiving and control system used with the fixed equipment in this invention, antenna 30 is connected through impedance matching transformers 70 and 75 or 71 and 76, relay 31, coaxial line 77, attenuator 78 and coaxial line 79 to receiver 35. Quarterwave transformer 70 connects with antenna 30 at offset points 32. Quarterwave transformer 71 connects with antenna 30 at offset points 33. Transformers 70 and 71 are suitably adjusted to match the impedance at the points at which they are connected. Half wave transformers 75 and 76 connected to quarter wave transformers 70 and 71, respectively, are interposed to isolate quarter wave transformers 70 and 71 from relay 31 in which the current carrying elements cannot be suitably spaced.

Receiver 35 is connected through switch 85, when switch 85 is in its upper position, directly to plates 25—25 of oscilloscope 26. With switch 85 in its lower position receiver 80 is connected to either filter 86 or filter 87, depending on whether switch 88 is in its upper or lower position. Filter 86 is a band pass filter passing a narrow band of frequencies centered at 10 kilocycles. Filter 87 is a band pass filter passing a narrow band of frequencies centered about 3 kilocycles.

A 10-kilocycle frequency as produced by modulator 22 in Fig. 1 is supplied through conductors 90 and filter 91 to phase shifter 23. Phase shifter 23 includes a resistance-capacitor network 92 supplying to the grids of amplifier tubes $T_6$ and $T_7$ control voltages equal in magnitude but 90 degrees out of phase. Tubes $T_6$ and $T_7$ supply to stator windings 95 and 96 currents equal in magnitude but 90 degrees out of phase. Stator coils 95 and 96 are shunted by tuning capacitors 97 and 98 adjusted to resonate at 10 kilocycles. Rotor coil 100, rotated by crank 27, shown in Fig. 1, picks up a 10-kilocycle frequency the phase of which depends on the orientation of rotor coil 100. The voltage picked up by rotor coil 100 is supplied to deflection plates 24—24 of oscilloscope 26. Conductors 104, connected to a source of alternating current, supply power through transformer 105, rectifier tube 106, and filter 107 to tubes $T_6$ and $T_7$ of the phase shifter circuit 23.

The output of receiver 35, as delivered by switch 85, is supplied through rectifier 108 and relay 38 to comparison circuit 41. Relay 38 is actuated by relay coil 52. Comparison circuit 41 has inputs 39 and 40 alternately supplied with the output of receiver 35 by relay contact element 109 causing condensers 110 and 111 to be alternately charged. The output of comparison circuit 41 is supplied through lines 112 to galvanometer 42. Galvanometer 42 is a well known commercial type of galvanometer controller actuated by motor $M_5$. Galvanometer 42 has a pointer which indicates the voltage, and the polarity thereof, supplied through lines 112 from comparison circuit 41. Through the action of motor $M_5$ a sampling mechanism is caused to exert a clamping action at frequent intervals upon the pointer of galvanometer 42 and indicate whether the pointer is at the mid-position of its scale or whether the pointer is on one side or the other of the mid-position. The clamping mechanism of pointer 44 of galvanometer 42 is capable of connecting the grids of either of tubes $T_1$ or $T_2$ through contacts 115 and 116 to ground potential, causing those tubes to conduct. Relay coil 117 of relay 120 and relay coil 118 of relay 121 are connected respectively in the plate circuits of tubes $T_1$ and $T_2$. Relays 120 and 121 are capable of acting through the antenna orientation control circuit in a manner to be explained below, to cause the antenna 30 to automatically follow in azimuth the balloon 10.

Antenna 30 may be rotated slowly in either direction by means of motor $M_1$ and magnetic clutches, the coils of which are shown at 45 and 46. Motor $M_1$ is connected to alternating current supply lines 141 and 142 and rotates always in one direction. Motor $M_1$ drives two oppositely rotating clutches, either of which may be energized electrically by clutch coils 45 and 46 to rotate antenna 30 about a vertical axis in one of two opposite directions. Antenna 30 may also be rotated at high speed in one direction only by motor $M_3$. Switches 135, 136, 137 and 138 are provided in the antenna orientation control circuit for selecting the manner of orientation. Switch 135 has an upper or "high speed" position and a lower or "normal" position. Switch 136 has an upper or "automatic" position and a lower or "manual" position. Switch 137 has an upper or "increase azimuth" position and a lower or "off" position. Switch 138 has an upper or "decrease azimuth" position and a lower or "off" position. Motor $M_3$ is connected to wire 142 of the power line and is connected through conductor 129, switch 135 in "high speed" position, switch 136 in "manual" position, and back through conductor 128 to wire 141 of the power line.

Clutch coils 45 and 46 are energized respectively through relays 131 and 130 from power supply 47 containing rectifier tube $T_{11}$ connected to power supply 141—142 through transformer 134. The left end of each of coils 132 and 133 of relays 130 and 131, respectively, is connected to power line 141. The right end of relay coil 132 is connected through wire 126, relay 121, switch 136 in "automatic" position, switch 135 in "normal" position to wire 142 of the power line. The right end of coil 133 is connected through conductor 127, relay 120, switch 136 in its "automatic" position, and switch 135 in its "normal" position, to wire 142 of the power line.

The right end of relay coil 132 is also connected through wire 126, switch 137 in its "off" position, switch 138 in its "decrease azimuth" position, switch 136 in its "manual" position, switch 135 in its "normal" position, and wire 123 to line 142 of the power supply. The right end of relay coil 133 is also connected through wire 127, switch 138 in its "off" position, switch 137 in its "increase azimuth" position, switch 136 in its "manual" position, switch 135 in its "normal" position, and wire 123 to wire 142 of the power supply.

The operation of antenna relay 31 and comparison circuit relay 38 is effected by a relay control circuit 50 (see Fig. 4). Relay control circuit 50 includes thyratron tubes T₃ and T₄, the plate circuits of which are supplied with power through alternating current supply lines 155 and transformer 156. The control grids of tubes T₃ and T₄ are supplied with negative bias potential by battery 160 through conductor 161, contacts 162 and conductor 163 (see Fig. 4a). Coil 52 of comparison circuit relay 38 is connected in series with coil 51 of antenna relay 31. These coils are energized by the plates of tubes T₃ and T₄ through lines 165 and 166. Contacts 162 are closed and opened during short equal periods by cam wheel 170 driven by motor M₅.

A synchro generator M₂ is coupled mechanically to rotate with the shaft of antenna 30 and is connected electrically to synchro motor M₄, a remote indicator. Excitation for synchros M₂ and M₄ is supplied through lines 141—142. The 3-phase control current passes from M₂ to M₄ through lines 150, 151 and 152.

Antenna control conductors 126, 127, 128, and 129, relay control conductors 165 and 166, synchro control conductors 150, 151 and 152, and alternating power supply line 141—142 are all enclosed in a shielded conduit 170 and are supplied with radio frequency chokes and grounded through condensers to prevent transients, caused by switching operations, from producing undesired noise in the radio receiving circuits.

In the operation of the receiver shown in Figs. 4 and 4a the radio frequency energy transmitted by balloon-borne transmitter 14 shown in Fig. 1 is transmitted through either of quarter-wave transformers 70 or 71 and either of half-wave transformers 75 or 76, through antenna relay 31 coaxial line 77, attenuator 78, and coaxial line 79 to receiver 35. Attenuator 78 is manually adjustable so that the output of the receiver 35 is approximately constant, the intensity of the radio energy received from balloon 10 changing greatly in magnitude as the balloon ascends and blows away from the fixed station. Attenuator 78 reduces the magnitude of received signal without shifting its phase. With switch 85 in its upper position the output of receiver 35 is applied directly to deflection plates 25—25 of oscilloscope 26. With switch 85 in its lower position the output of receiver 35 is supplied to deflection plates 25 after passing through either filter 86 or the filter 87 depending on whether switch 88 is in its upper or lower position. Switch 85 is normally in its upper position but if undesired frequencies are present in the output of receiver 35 the received signal is passed through either filter 86 or 87 to filter out substantially all frequencies but the 10-kilocycle or 3-kilocycle frequency, whichever is being transmitted by transmitter 20 of Fig. 1.

Filter 91 is arranged to filter out any undesired signal that may be present in lines 90 from modulator 22. Phase shifter 92 serves to place upon deflection plates 24—24 the modulation frequency produced by modulator 22 shifted in phase as determined by the orientation of rotor coil 100 controlled by crank 27. The position of crank 27 is therefore indicative of the distance to the balloon and a dial calibrated in miles may be attached to the shaft of rotor 100.

The output of receiver 35 as delivered by switch 85 is supplied through rectifier tube 108 to either input 39 or 40 of comparison circuit 41 depending on the position of the contact element 109 of relay 38. The output of receiver 35 serves to charge first condensers 110 and then condensers 111 of comparison circuit 41. Condensers 110 and 111 tend to discharge through resistors 110' and 111'. No voltage will be produced across these resistors if condensers 110 and 111 are equally charged. However, if either set of condensers 110 or 111 is charged to a greater degree than the other, one polarity or the other will appear across lines 112.

The voltage appearing across lines 112 is applied to galvanometer 42 to determine the position of needle 44. With needle 44 in its middle position neither of tubes T₁ or T₂ conducts but if a voltage of one polarity is applied to galvanometer 42, needle 44 will cause a positive potential to be applied to the grid of tube T₁, thereby energizing coil 117 of relay 120. If a voltage of the other polarity is applied to galvanometer 42, relay 121 will be operated through tube T₂ and coil 118.

As cam wheel 170 is rotated by motor M₅, contacts 162 alternately close for short periods of about two seconds and open for intermediate equal periods. When contacts 162 open, thyratron tubes T₃ and T₄ conduct, actuating antenna relay 31 and comparison circuit relay 38. With antenna relay 31 energized coaxial cable 77 is connected through transformers 75 and 70 to offset points 32 of the antenna 30. In this position relay 31 shorts the conductors at the end of transformer 76. Half-wave transformer 76 reproduces this low impedance condition at its other end and quarter-wave line 71 inverts this condition at connecting points 33 where a condition of very high impedance is set up. With coil 51 of antenna relay 31 deenergized coaxial cable 77 is connected to points 33 of antenna 30 while a very high impedance appears across points 32 and in the manner explained above.

Coil 52 is energized and deenergized synchronously with coil 51 of the antenna relay 31. When antenna 30 is connected at points 32 to obtain an axis of maximum reception as shown at 69 in Fig. 2, the output of receiver 35 is connected to input 39 of comparison circuit 41. With coils 51 and 52 deenergized the antenna 30 is connected through point 33 to obtain an axis of maximum reception as shown in 67 of Fig. 2. The output of receiver 35 is connected through input 40 of comparison circuit 41.

With switch 135 in "high speed" position, switch 136 in "manual" position, and switches 137 and 138 in "off" position, antenna 30 is rapidly rotated to an initial position such that its normal axis is approximately in line with balloon 10. With switch 135 in "normal" position, switch 136 in "manual" position, switch 137 in "off" position, and switch 138 in "decrease azimuth" position antenna 30 will be slowly rotated in a direction to decrease its azimuth indication by motor M₁ and one of clutches 45—46. By reversing the position of switches 137 and 138 so that switch 137 is in "increase azimuth" position and switch 138 is in "off" position antenna 30 will be slowly rotated in the opposite direction by motor M₁. Thus by manual manipulation antenna 30 may be accurately aimed in any direction.

After the initial manual aiming in which antenna reception axes 67 and 69 as shown in Fig. 2 have been placed on either side of balloon 10, automatic operation is effected by placing switch 135 in "normal" position, switch 136 in "automatic" position, and switches 137 and 138 in "off" position. Then operation of relays 120 and 121 will operate relays 130 and 131 which in turn will operate magnetic clutch coils 45 and 46 to automatically maintain the proper orientation of antenna 30 with respect to balloon 10. The speed of motor M1 will be coordinated with the speed of motor M5 so that the speed of rotation of antenna 30 and the frequency of sampling by galvanometer 42 will cause antenna to track balloon 10 with a minimum of hunting.

Synchro motor M4 which being connected to synchro generator M2 reproduces the angular orientation of antenna 30, may be used in a recording instrument to continuously record the azimuth of balloon 10 against time. Balloon 10 may be arranged, as is well known in the art, to also radio at frequent intervals a barometric reading indicative of its altitude. Since the azimuth, slant range, and altitude of balloon 10 are known almost continuously throughout its flight it is obvious that its position at any time can be plotted, and therefore the wind velocity and direction at any height ascertained.

It will be obvious that the fixed ground equipment shown in Fig. 1 need not be absolutely fixed but would be equally effective operated from a movable object such as a ship. It will also be obvious that the frequencies used by the transmitters 20 and 14 and by the receivers 12 and 35, as well as the frequencies produced by modulator 22 are illustrative only as given in the above description and that other frequencies may be satisfactorily used. It is to be understood that this invention is not limited to any specific construction but might be embodied in various forms without departing from the scope of the invention.

What is claimed is:

1. In combination, an antenna comprising receiving elements arranged in a plane, reflecting means for causing said antenna to receive from substantially one direction, a radio receiver having an input and an output, the input of said receiver being connected to said antenna by a connection shifting means through one of two offset connecting points on said antenna, said shifting means causing the axis of maximum reception of said antenna to alternately shift to either side of the axis normal to the plane of said antenna, an oscilloscope having deflecting means in two planes, the output of said receiver being connected to said oscilloscope deflecting means in one plane, means for supplying a reference frequency to the deflecting plates in the other of said planes, means for shifting the phase of said reference frequency, a comparison circuit having two inputs and an output, said comparison circuit being adapted to compare said inputs and produce at its output a voltage having a polarity indicative of which input predominates in magnitude, means operating synchronously with said connection shifting means whereby when said axis of maximum reception is on one side of said normal axis the output of said receiver is applied to one input of said comparison circuit and when the axis of maximum reception is on the other side of said normal axis the output of said receiver is applied to the other input of said comparison circuit, means for rotating the plane of said antenna, means whereby when the output of said comparison circuit is of either polarity the antenna rotating means rotates the antenna until the output of said comparison means is zero.

2. In combination, an antenna having a normal axis of maximum reception, shifting means for causing the axis of maximum reception to alternately shift from an offset axis on one side of said normal axis to an offset axis on the other side of said normal axis, means for connecting said antenna to a radio receiver having an output, an indicating means having two deflection means, each in a different plane, means for connecting the output of said receiver to the deflection means in one plane, a means for producing a reference frequency, means for applying said reference frequency to said deflection means in said other plane, a comparison means for comparing the reception along said two offset axes of reception, means for rotating said antenna until the receptions along said two offset axes are equal.

EVAN G. LAPHAM.

REFERENCES CITED

The following references are of record in the file of this patent:

UNITED STATES PATENTS

| Number | Name | Date |
| --- | --- | --- |
| 2,160,857 | Gothe | June 6, 1939 |
| 2,171,561 | Hooven | Sept. 6, 1939 |
| 2,173,841 | Hooven | Sept. 26, 1939 |
| 2,176,469 | Moueix | Oct. 17, 1939 |
| 2,266,038 | Hinman, Jr. | Dec. 16, 1941 |
| 2,276,235 | Lamb | Mar. 10, 1942 |
| 2,411,034 | Gluyas et al. | Nov. 12, 1946 |
| 2,412,159 | Leeds | Dec. 3, 1946 |
| 2,412,612 | Godet | Dec. 17, 1946 |
| 2,421,663 | Tolson | June 3, 1947 |
| 2,422,068 | Bedford | June 10, 1947 |
| 2,424,193 | Rost et al. | July 15, 1947 |
| 2,427,029 | Sterns | Sept. 9, 1947 |